United States Patent Office 2,788,352
Patented Apr. 9, 1957

2,788,352

PREPARATION OF ESTRATRIENES FROM Δ⁴-19-NOR-ANDROSTENE-3-ONES

Carl Djerassi, Birmingham, Mich., and George Rosenkranz and Franz Sondheimer, Mexico City, Mexico, assignors to Syntex S. A., Mexico City, Mexico, a corporation of Mexico No Drawing. Application March 1, 1955,
Serial No. 491,521

Claims priority, application Mexico March 4, 1954

8 Claims. (Cl. 260—397.4)

The present invention relates to a novel method for the preparation of cyclopentanophenanthrene derivatives.

More particularly, the present invention relates to a novel process for the production of estratriene derivatives, i. e. steroidal compounds characterized by possessing the ring a structure of the estrogens, the Δ¹,³,⁵⁽¹⁰⁾-triene aromatic system, from the corresponding Δ⁴-19-nor-androstene or the Δ⁴-19-nor-pregnene derivatives.

The Δ⁴-19-nor-androstene compounds and the Δ⁴-19-nor-pregnene compounds, which may be considered broadly to be Δ⁴-19-nor-androstene derivatives, are known compounds produced by recently published methods. These compounds exhibit hormone activities of a high order.

The present invention relates to a novel process for the conversion of 19-nor-steroid derivatives into the corresponding compounds having an aromatic ring A structure characteristic of the estrogen derivatives. It has further been discovered in accordance with the present invention that by refluxing a 19-nor compound in an inert solvent such as xylene, p-cymene or other similar solvent in the presence of a palladium dehydrogenation catalyst, there is produced the corresponding ring A aromatic compounds. Further, there has been discovered in accordance with the present invention that the same process involving a dehydrogenation can be carried out by dissolving the 19-nor steroid in an inert solvent such as mineral oil, tetraline or cyclohexane and which is vaporized at temperatures of between 500° and 600° C. and heating the steroid solution in the solvent to such a temperature.

The process of the present invention may be illustrated by the following equation:

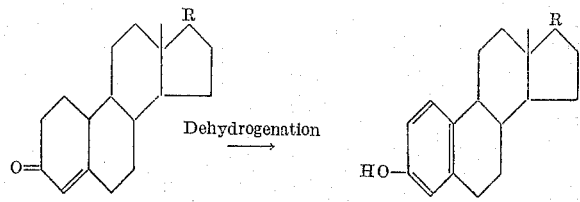

In the above equation R may represent the side chains characterizing compounds of the pregnane or androstane series and/or may represent

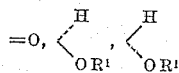

acetyl, hydroxy-acetyl, acyloxy-acetyl, alkyl, alkylene, oxy-alkyl, oxy-alkylene, oxo-alkyl, oxo-alkylene or acyloxy-alkyl. R¹ represents H or acyl.

In practicing the process above outlined the nor steroid as for example Δ⁴-19-nor-androstene-17β-ol-3-one or other 19-nor-steroids, as indicated above, are dissolved in a suitable inert organic solvent such as p-cymene or xylene. A hydrogenation catalyst is added, preferably a palladium catalyst such as palladium-on-charcoal or palladium-on-asbestos, and the mixture is refluxed for a long period of time, preferably under an atmosphere of nitrogen. The catalyst is then filtered and the organic solvent removed as by steam distillation. The solid product thereafter collected may be purified by conventional procedure such as recrystallization.

In the second modification of the present invention the 19-nor-steroid is dissolved in a suitable high-boiling, inert, hydro-carbon solvent such as mineral oil, tetraline or cyclohexane and then the solution is passed at a suitable rate, as for example of the order of 2 cc. per second, through a glass tube packed with glass helices and heated to a temperature of between 500° and 600° C. The solution is then cooled and the organic solvent removed by steam distillation. A crystalline precipitate results and this precipitate after filtration and washing, as for example with hexane gives the desired product.

The following specific examples serve to illustrate but are not intended to limit the present invention:

Example I 200 mg. of palladium-on-charcoal catalyst was added to a solution of 1 g. of Δ⁴-19-nor-androsten-17β-ol-3-one in 30 cc. of p-cymene and the mixture was refluxed for 60 hours under an atmosphere of nitrogen. The catalyst was filtered, the organic solvent was removed by steam distillation and the solid product was collected. Recrystallization afforded pure estradiol with a melting point of 174°–176° C.

The following equation illustrates this example:

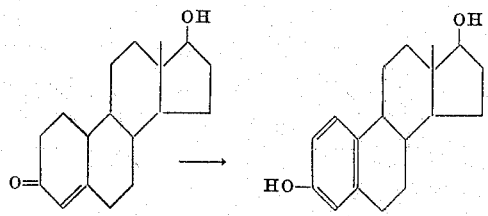

Example II 1 g. of Δ⁴-19-nor-androsten-17β-ol-3-one was dissolved in 40 cc. of p-cymene, mixed with 200 mg. of palladium-on-asbestos catalyst and then the procedure described in Example I was followed, thus yielding estradiol, identical to that obtained previously.

Example III 1 g. of Δ⁴-19-nor-androstene-3,17-dione was treated by the method described in Example I to give estrone with a melting point of 256°–258° C.

The following equation illustrates this example:

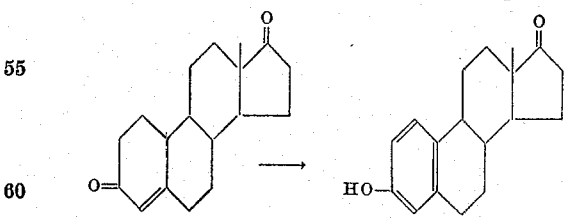

Example IV 1 g. of Δ⁴-19-nor-androstene-3,17-dione was dissolved in 100 cc. of mineral oil and the solution was passed at a rate of 2 cc. per second through a glass tube packed with glass helices and heated to 600° C. The solution was kept standing in the refrigerator and the crystals formed were collected and washed with hexane to remove the mineral oil impregnating the crystals, thus affording estrone, identical to that obtained in accordance with Example III.

Example V 1 g. of $\Delta^4$-19-nor-pregnene-3,20-dione (19-nor-progesterone) was dissolved in 100 cc. of cyclohexane and the solution was passed at a rate of 2 cc. per second through a glass tube packed with glass helices and heated to a temperature of 600° C. The solution was cooled, the organic solvent was removed by steam distillation and the crystalline precipitate was filtered and washed with hexane, thus yielding 3-hydroxy-17$\beta$-acetyl-$\Delta^{1,3,5(10)}$-estratriene (aromatic analogue of progesterone) with a melting point of 246°–249° C.

The following equation illustrates this example:

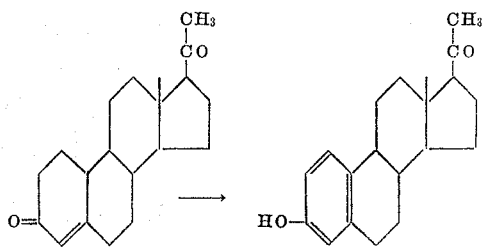

Example VI 1 g. of the acetate of $\Delta^4$-19-nor-pregnen-21-ol-3,20-dione was treated in accordance with the method described in Example II, thus giving 3-hydroxy-17$\beta$-(acetyloxy - acetyl)-$\Delta^{1,3,5(10)}$-estratriene. Acetylation of this compound with acetic anhydride in pyridine solution afforded the diacetate of 3-hydroxy-17$\beta$-(hydroxy-acetyl)-$\Delta^{1,3,5(10)}$-estratriene (aromatic analogue of desoxycorticosterone) with a melting point of 122°–124° C.

The following equation illustrates this example:

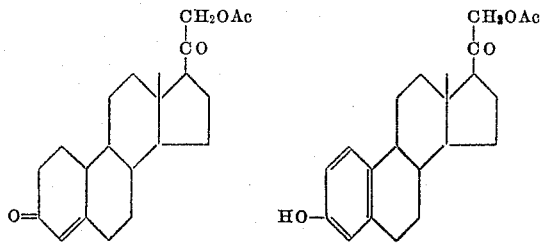

We claim:

1. A method for the preparation of derivatives of 3-hydroxy-$\Delta^{1,3,5(10)}$-estratriene which comprises heating the corresponding derivatives of $\Delta^4$-19-nor-androstene-3-one in an inert solvent in the presence of a palladium catalyst.

2. The method of claim 1 wherein the dehydrogenation catalyst is a palladium-on-charcoal catalyst.

3. The method of claim 2 wherein starting derivative is $\Delta^4$-19-nor-androstene-17$\beta$-ol-3-one and the product is estradiol.

4. The method of claim 2 wherein the starting derivative is $\Delta^4$-19-nor-androstene-3,17-dione and the product is estrone.

5. A method for the preparation of derivatives of 3-hydroxy-$\Delta^{1,3,5(10)}$-estratriene which comprises dissolving a corresponding derivative of $\Delta^4$-19-nor-androstene-3-one in an inert solvent and by heating the solution in the vapor phase at a temperature of between 500° and 600° C.

6. The method of claim 5 wherein the starting derivative is $\Delta^4$-19-nor-androstene-3,17-dione and the product is estrone.

7. The method of claim 5 wherein the starting derivative is 19-nor-progesterone and the product is 3-hydroxy-17$\beta$-acetyl-$\Delta^{1,3,5(10)}$-estratriene.

8. The method of claim 5 wherein the starting derivative is $\Delta^4$-19-nor-pregnene-21-ol-3,20-dione and the product is 3-hydroxy-17$\beta$-(acetyloxy-acetyl)-$\Delta^{1,3,5(10)}$-estratriene.

References Cited in the file of this patent

UNITED STATES PATENTS

| | | |
|---|---|---|
| 2,280,828 | Inhoffen | Apr. 28, 1942 |
| 2,671,092 | Djerassi | Mar. 2, 1954 |
| 2,705,237 | Djerassi | Mar. 29, 1955 |
| 2,705,719 | Rubin | Apr. 5, 1955 |